(12) United States Patent
Ahn et al.

(10) Patent No.: US 12,542,902 B2
(45) Date of Patent: Feb. 3, 2026

(54) INFERENCE METHOD AND DEVICE USING VIDEO COMPRESSION

(71) Applicant: INTELLECTUAL DISCOVERY CO., LTD., Seoul (KR)

(72) Inventors: Yongjo Ahn, Seoul (KR); Jongseok Lee, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 62 days.

(21) Appl. No.: 18/580,567

(22) PCT Filed: Jul. 25, 2022

(86) PCT No.: PCT/KR2022/010907
§ 371 (c)(1),
(2) Date: Jan. 18, 2024

(87) PCT Pub. No.: WO2023/003448
PCT Pub. Date: Jan. 26, 2023

(65) Prior Publication Data
US 2025/0088632 A1    Mar. 13, 2025

(30) Foreign Application Priority Data

Jul. 23, 2021 (KR) .................. 10-2021-0097333
Jul. 23, 2021 (KR) .................. 10-2021-0097334

(51) Int. Cl.
*H04N 11/02*     (2006.01)
*H04N 19/124*    (2014.01)
(Continued)

(52) U.S. Cl.
CPC ......... *H04N 19/124* (2014.11); *H04N 19/132* (2014.11); *H04N 19/18* (2014.11)

(58) Field of Classification Search
CPC ..... H04N 19/124; H04N 19/132; H04N 19/18
(Continued)

(56) References Cited

U.S. PATENT DOCUMENTS

2016/0259994 A1* 9/2016 Ravindran ............... G06N 3/04
2018/0012110 A1* 1/2018 Souche ............... G06V 10/454
(Continued)

FOREIGN PATENT DOCUMENTS

| CN | 111899176 A | 11/2020 |
|---|---|---|
| KR | 10-2016-0034814 A | 3/2016 |
| WO | 2021/050007 A1 | 3/2021 |

OTHER PUBLICATIONS

International Search Report & Written Opinion for PCT/KR2022/010907 by Korean Intellectual Property Office dated Nov. 9, 2022.
(Continued)

*Primary Examiner* — Jayanti K Patel
*Assistant Examiner* — Richard B Carter
(74) *Attorney, Agent, or Firm* — BROADVIEW IP LAW, PC

(57) ABSTRACT

A neural network-based image processing method and device according to embodiments of the present invention can: perform preprocessing for an input image; obtain a feature map from the pre-processed image by means of a neural network comprising a plurality of neural network layers; perform quantization for the obtained feature map; and perform video conversion with respect to the quantized feature map.

11 Claims, 15 Drawing Sheets

(51) Int. Cl.
*H04N 19/132* (2014.01)
*H04N 19/18* (2014.01)

(58) Field of Classification Search
USPC .................................................... 375/240.03
See application file for complete search history.

(56) References Cited

U.S. PATENT DOCUMENTS

2020/0364552 A1* 11/2020 Guo ..................... H03M 7/24
2024/0064296 A1*  2/2024 Chen ................... G06N 3/0985

OTHER PUBLICATIONS

Haiwu Zhao et al. 'A CNN-Based Post-Processing Algorithm for Video Coding Efficiency Improvement', IEEE Access, Special Section on Mobile Multimedia : Methodology and Applications, Jan. 3, 2020.

Tong Chen et al. 'DeepCoder: A deep neural network based video compression', 2017 IEEE Visual Communications and Image Processing (VCIP), Mar. 1, 2018.

* cited by examiner

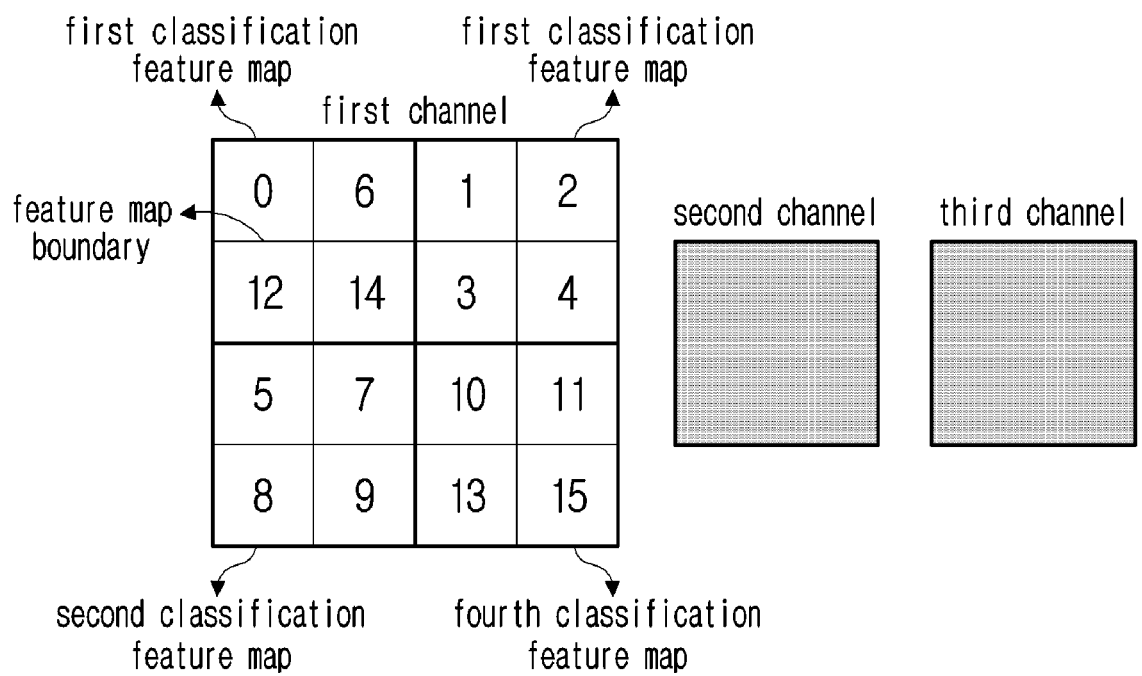

INFERENCE METHOD AND DEVICE USING VIDEO COMPRESSION

CROSS-REFERENCE TO RELATED APPLICATIONS

This application is a National Phase Entry Application of PCT Application No. PCT/KR2022/010907 filed on Jul. 25, 2022, which claims priority to Korean Patent Application No. 10-2021-0097333 filed on Jul. 23, 2021, and Korean Patent Application No. 10-2021-0097334 filed on Jul. 23, 2021, in Korean Intellectual Property Office, the entire contents of which are hereby incorporated by reference in its entirety.

TECHNICAL FIELD

The present invention relates to an inference method and device using video compression, and more specifically, to a method and device for compressing a feature map using video compression.

BACKGROUND ART

Video images are compressed and encoded by removing spatial-temporal redundancy and inter-view redundancy, and may be transmitted through communication lines or stored in a suitable form on a storage medium.

DISCLOSURE

Technical Problem

The present invention proposes a method and device that simultaneously performs inference and image encoding/decoding using a neural network. Accordingly, the present invention aims to provide convenience to people and machines by using the neural network inferencer proposed in the present invention.

The present invention proposes a method and device for compressing a feature map, which is an intermediate result of a neural network, using video compression. Accordingly, the present invention aims to improve the coding efficiency of feature map compression by applying the feature map compression method proposed in the present invention.

Technical Solution

In order to solve the above problems, a method and device for performing inference and image encoding/decoding using a neural network are provided. Additionally, in order to solve the above problems, an inference method and device using video compression are provided.

A neural network-based image processing method and device according to an embodiment of the present invention may perform pre-processing on an input image, obtain a feature map from the pre-processed image using a neural network including a plurality of neural network layers, perform quantization on the obtained feature map, and perform video conversion on the quantized feature map.

A neural network-based image processing method and device according to an embodiment of the present invention may generate an input tensor by performing at least one of normalization or resolution scaling on the input image according to a predefined specific condition.

In the neural network-based image processing method and device according to an embodiment of the present invention, the specific condition may be defined in consideration of the input format of the neural network.

In the neural network-based image processing method and device according to an embodiment of the present invention, the feature map may be generated by applying a plurality of neural network layers included in the neural network to the input tensor.

In the neural network-based image processing method and device according to an embodiment of the present invention, the plurality of neural network layers may include at least one of a convolution layer, a graph convolution layer, a pooling layer, a sampling layer, a shuffle layer, or a normalization layer.

The neural network-based image processing method and device according to an embodiment of the present invention may generate a bitstream by encoding the converted video using a video encoder.

In the neural network-based image processing method and device according to an embodiment of the present invention, the obtained feature map may include mesh data.

The neural network-based image processing method and device according to an embodiment of the present invention may map the obtained feature map to a video including a plurality of channels.

In the neural network-based image processing method and device according to an embodiment of the present invention, the video may include a first channel, a second channel, and a third channel. The first channel may represent a luma channel, and the second and third channels may represent chroma channels.

The neural network-based image processing method and device according to an embodiment of the present invention may sequentially assign a plurality of feature map channels included in the feature map to the first to third channels according to channel numbers.

The neural network-based image processing method and device according to an embodiment of the present invention may assign a plurality of feature map channels included in the feature map to the first to third channels according to channel numbers in a predefined order.

A neural network-based image processing method and device according to an embodiment of the present invention may perform padding on a remaining region to which a plurality of feature map channels included in the feature map are not assigned within at least one channel among the first to third channels.

A neural network-based image processing method and device according to an embodiment of the present invention may perform asymmetric scaling on the feature map channels assigned to the second and third channels in consideration of the color format of the video.

A neural network-based image processing method and device according to an embodiment of the present invention may classify a plurality of feature map channels included in the feature map into a predefined number of classes according to attributes and assign a plurality of feature map channels included in the feature map to the first to third channels according to the classified classes.

In the neural network-based image processing method and device according to an embodiment of the present invention, the feature map channels may be classified based on spatial similarity of the input image.

Technical Effects

Video signal coding efficiency may be improved through the inference method and device using a neural network according to the present invention. By using the neural network inferencer proposed in the present invention, convenience may be provided to people and machines.

Video signal coding efficiency may be improved through the inference method and device using video compression according to the present invention. By applying the feature map compression method proposed in the present invention, the coding efficiency of feature map compression may be improved.

DESCRIPTION OF DIAGRAMS

FIG. 16 is a diagram for explaining a feature map mapping method according to an embodiment of the present invention.

FIG. 17 is a diagram for explaining a feature map mapping method according to an embodiment of the present invention.

BEST MODE

Figure 1:
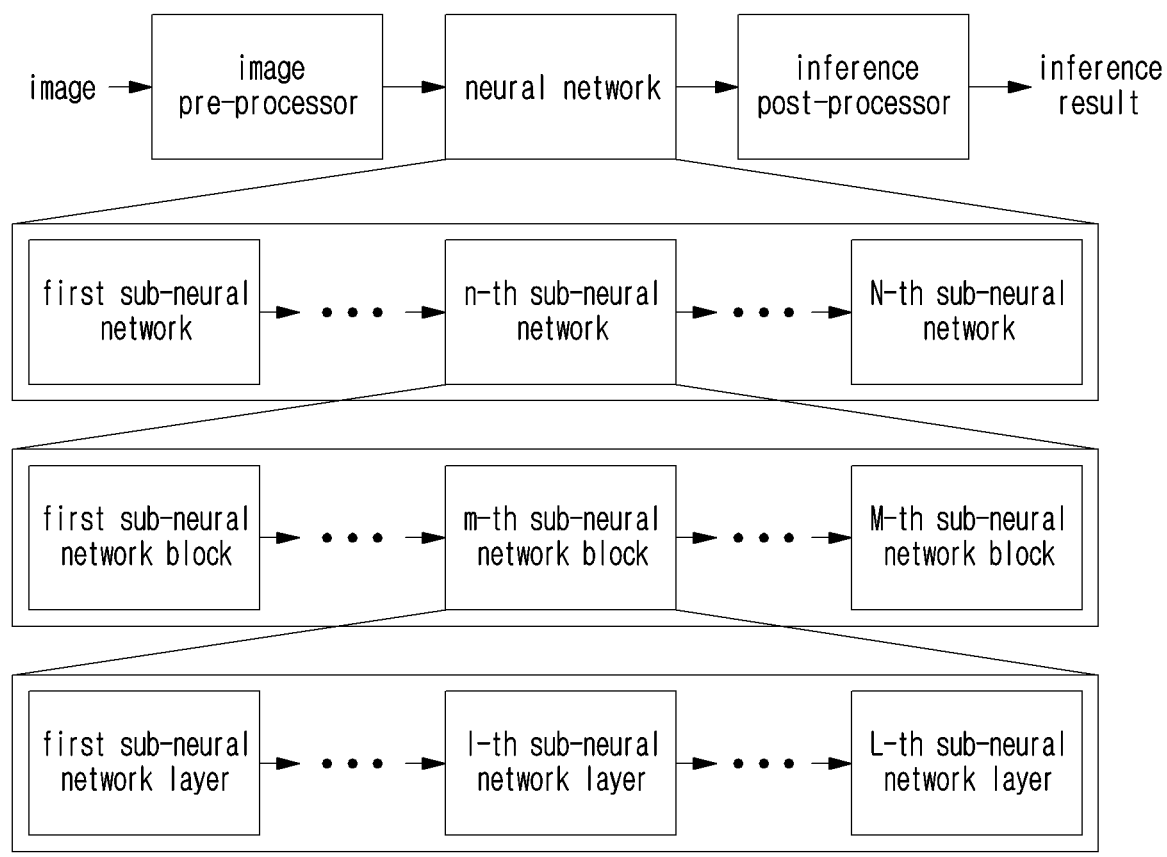
FIG. 1 is a diagram illustrating a block diagram of a neural network-based inferencer according to an embodiment of the present invention.

A neural network-based image processing method and device according to an embodiment of the present invention may perform pre-processing on an input image, obtain a feature map from the pre-processed image using a neural network including a plurality of neural network layers, perform quantization on the obtained feature map, and perform video conversion on the quantized feature map.

A neural network-based image processing method and device according to an embodiment of the present invention may generate an input tensor by performing at least one of normalization or resolution scaling on the input image according to a predefined specific condition.

In the neural network-based image processing method and device according to an embodiment of the present invention, the specific condition may be defined in consideration of the input format of the neural network.

In the neural network-based image processing method and device according to an embodiment of the present invention, the feature map may be generated by applying a plurality of neural network layers included in the neural network to the input tensor.

In the neural network-based image processing method and device according to an embodiment of the present invention, the plurality of neural network layers may include at least one of a convolution layer, a graph convolution layer, a pooling layer, a sampling layer, a shuffle layer, or a normalization layer.

The neural network-based image processing method and device according to an embodiment of the present invention may generate a bitstream by encoding the converted video using a video encoder.

In the neural network-based image processing method and device according to an embodiment of the present invention, the obtained feature map may include mesh data.

The neural network-based image processing method and device according to an embodiment of the present invention may map the obtained feature map to a video including a plurality of channels.

In the neural network-based image processing method and device according to an embodiment of the present invention, the video may include a first channel, a second channel, and a third channel. The first channel may represent a luma channel, and the second and third channels may represent chroma channels.

The neural network-based image processing method and device according to an embodiment of the present invention may sequentially assign a plurality of feature map channels included in the feature map to the first to third channels according to channel numbers.

The neural network-based image processing method and device according to an embodiment of the present invention may assign a plurality of feature map channels included in the feature map to the first to third channels according to channel numbers in a predefined order.

A neural network-based image processing method and device according to an embodiment of the present invention may perform padding on a remaining region to which a plurality of feature map channels included in the feature map are not assigned within at least one channel among the first to third channels.

A neural network-based image processing method and device according to an embodiment of the present invention may perform asymmetric scaling on the feature map channels assigned to the second and third channels in consideration of the color format of the video.

A neural network-based image processing method and device according to an embodiment of the present invention may classify a plurality of feature map channels included in the feature map into a predefined number of classes according to attributes and assign a plurality of feature map channels included in the feature map to the first to third channels according to the classified classes.

In the neural network-based image processing method and device according to an embodiment of the present invention, the feature map channels may be classified based on spatial similarity of the input image.

MODE

An embodiment of the present disclosure will be described in detail so that those skilled in the art may easily implement it by referring to a drawing attached to this specification. But, the present disclosure may be implemented in different forms and it is not limited to an embodiment described herein. And, a part irrelevant to a description is omitted to clearly describe the present disclosure in a drawing and a similar reference numeral is attached to a similar part throughout this specification.

Throughout this specification, when a part is referred to as being 'connected' to other part, it may include an electrical connection that other element presents therebetween as well as a direct connection.

In addition, when a part is referred to as 'including' a component throughout this specification, it means other component may be further included without excluding other component unless otherwise opposed.

In addition, a term such as first, second, etc. may be used to describe a variety of components, but the components should not be limited by the terms. The terms are used only to distinguish one component from other component.

In addition, for an embodiment about a device and a method described in this specification, some configurations of a device or some steps of a method may be omitted. In addition, order of some configurations of a device or some steps of a method may be changed. In addition, other configuration or other step may be inserted into some configurations of a device or some steps of a method.

In addition, some configurations or some steps of a first embodiment of the present disclosure may be added to a second embodiment of the present disclosure or may substitute some configurations or some steps of a second embodiment.

In addition, construction units shown in an embodiment of the present disclosure are independently shown to represent different characteristic functions, and they do not mean that each construction unit is configured with separated hardware or one software construction unit. In other words, each construction unit is described by being enumerated as each construction unit for convenience of a description and at least two construction units of each construction unit may be combined to form one construction unit or one construction unit may be partitioned into a plurality of construction units to perform a function. An integrated embodiment and separated embodiment of each construction unit are also included in a scope of a right of the present disclosure unless they are departing from the spirit of the present disclosure.

First, terms used in this application may be briefly described as follows.

A decoding device (Video Decoding Apparatus) to be described later may be a device included in a server terminal such as a civil security camera, a civil security system, a military security camera, a military security system, a personal computer (PC), a notebook computer, a portable multimedia player (PMP), a wireless communication terminal, a smart phone, a TV application server and a service server, etc. and it may mean a variety of devices equipped with a user terminal including equipment of every kind, a communication device including a communication modem, etc. for communication with a wired/wireless communication network, a memory for storing various kinds of programs and data for decoding an image or performing intra or inter prediction for decoding, a microprocessor for executing a program and performing operation and control and others.

In addition, an image encoded as a bitstream by an encoder may be transmitted to an image decoding device, decoded and reconstructed and reproduced as an image through a variety of communication interface such as a cable, an universal serial bus (USB), etc. or through a wired or wireless communication network, etc. such as the Internet, a wireless local area network, a wireless LAN network, a Wi-Bro network, a mobile communication network, etc. in real time or in non-real time. Alternatively, a bitstream generated by an encoder may be stored in a memory. The memory may include both a volatile memory and a non-volatile memory. In this specification, a memory may be expressed as a recoding medium storing a bitstream.

Commonly, a video may be configured with a series of pictures and each picture may be partitioned into coding units like a block. In addition, a person with ordinary skill in the art to which this embodiment pertains may understand that a term of picture entered below may be used by being substituted with other term having the same meaning as an image, a frame, etc. And, a person with ordinary skill in the art to which this embodiment pertains may understand that a term of coding unit may be used by being substituted with other term having the same meaning as a unit block, a block, etc.

Hereinafter, in reference to attached drawings, an embodiment of the present disclosure is described in more detail. In describing the present disclosure, an overlapping description is omitted for the same component.

FIG. 1 is a diagram illustrating a block diagram of a neural network-based inferencer according to an embodiment of the present invention.

Referring to FIG. 1, a neural network may be generally used in applications such as image classification, image restoration, image segmentation, object recognition, and object tracking. A neural network may be trained to receive image input and infer results appropriate for each application. FIG. 1 may be an example of a block diagram of a neural network-based inferencer.

In this case, the input of the neural network may be fixed to a predefined specific form depending on the application. In other words, depending on the application, the input conditions of the neural network may be defined with respect to a specific form. Here, the form may be defined based on at least one of the horizontal length of data, the vertical length of data, the number of channels, the color space, a subsampling method, or the dynamic range of data values. For example, the resolution of the input image of a neural network should be 600×600 to be processed by the neural network. Alternatively, the number of input channels should be three to be processed by a neural network. Alternatively, the range of input data values should be between 0 and 1 to be processed by a neural network. Alternatively, it may be a value between −1 and 1. Alternatively, if the input data is an image, the color space of the input data should be RGB to be processed by a neural network. Therefore, an image pre-processing process that converts the input data to fit the input form of the neural network may be necessary. In other words, an image pre-processing process may be performed to convert the input data to fit the input form of the neural network.

The output of the neural network may also be in the same form depending on the application. For example, if the application is image classification, the output may be a vector with a length equal to the number of classes to be classified. To use this vector, an index with the largest value among the vector values may be required. The class may be known using the corresponding index. As another example, if the application in which a neural network is to be used is object tracking, the output of the neural network may be a number of vectors representing the horizontal length, vertical length, and type of the object, etc. In order to use this vector, conversion to a two-dimensional box may be required on the image. Therefore, a post-inference processing process that converts the output of the neural network to fit the application may be necessary. In other words, a post-inference processing process may be performed to convert the output of the neural network to fit the application.

According to one embodiment of the present invention, the neural network-based inferencer of FIG. 1 may receive an image as input and output an inference result. A neural network-based inferencer may include an image pre-processor, a neural network, and an inference post-processor.

The image pre-processor may generate an input tensor by receiving an image as input and performing pre-processing to fit the input form of the neural network. The generated input tensor may be transmitted to the neural network. Here, the tensor may refer to three-dimensional data or three-dimensional or more data.

A neural network may receive an input tensor and generate an output tensor through multiple neural network layers. The generated output tensor may be transmitted to the inference post-processor. A neural network may include multiple sub-neural networks. In this case, each sub-neural network may be connected in series or parallel. Tensors may be transmitted between sub-neural networks.

As an embodiment, data expressed in various forms such as a scalar value, a vector, a tensor, an image, a video, a bitstream, etc. may be transmitted between one neural network and an adjacent neural network. As an example, the data may be transmitted between adjacent neural networks in the form of a tensor, which is three-dimensional data.

One sub-neural network may include multiple neural network blocks, and the neural network blocks may be connected in series or parallel. Additionally, each sub-neural network may include a different number of neural network blocks. Neural network blocks may perform inference by exchanging tensors with each other.

One neural network block may be composed of multiple neural network layers. Different neural network blocks may have different numbers of layers. In other words, a neural network block may include one or more neural network layers. The layers of a neural network block may be connected to each other in series or parallel, and data may move between each layer in the form of a tensor. Here, the neural network layer may be one of a convolution layer, a pooling layer, a summation layer, a scaling layer, a sub-pixel layer, and an active layer.

Figure 2:
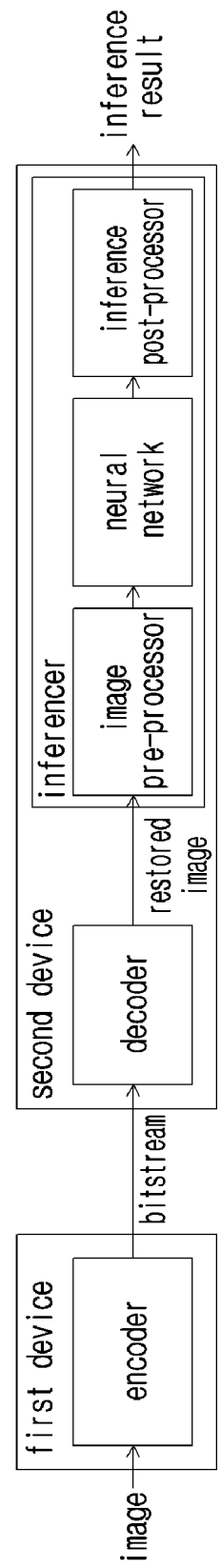
FIG. 2 is a diagram illustrating a block diagram of a neural network-based inferencer according to an embodiment of the present invention.

FIG. 2 is a diagram illustrating a block diagram of a neural network-based inferencer according to an embodiment of the present invention. FIG. 2 illustrates a case where the neural network inferencer is implemented as a configuration included in a second device that is a receiving end. The neural network inferencer and decoder may be implemented as separate configurations, or the neural network inferencer may be implemented as being included in the decoder.

The embodiment of FIG. 2 may be a part (w20408) related to evaluation pipeline 1 for evaluating the performance of VCM.

The neural network-based inferencer may include a first device and a second device. In the present invention, a neural network-based inferencer may be abbreviated as a inferencer. For example, the first and second devices may each mean a client or a server. Alternatively, the first and second devices may mean CPU and GPU. In this case, the first device may include an encoder. The encoder may receive video input, generate a bitstream, and transmit it to a second device. In this case, the encoder may be an encoder of an image compression standard such as JPEG or JEPG200. Alternatively, it may be an encoder of a video compression standard such as H.264/AVC, H.265/HEVC, or H.266/VVC. Alternatively, it may be a neural network-based video encoder composed of multiple layers.

The second device may receive a bitstream from the first device and output an inference result. The second device may include a decoder and a inferencer. The decoder may decode the transmitted bitstream and generate a restored image. The generated restored image may be transmitted to the inferencer. Here, the decoder may be a decoder of an image compression standard such as JPEG or JEPG200. Alternatively, it may be a decoder of a video compression standard such as H.264/AVC, H.265/HEVC, or H.266/VVC. Alternatively, it may be a neural network-based video decoder composed of multiple layers.

The inferencer may receive the restored image as input and output the inference result. The inferencer may include an image pre-processor, a neural network, and an inference post-processor. The image pre-processor may generate an input tensor by receiving the restored image and performing pre-processing to fit the input format of the neural network. The generated input tensor may be transmitted to the neural network. A neural network may generate an output tensor from the received input tensor through multiple neural network layers. The generated output tensor may be transmitted to the inference post-processor. The inference post-processor may post-process the input output tensor to fit the output format and output the inference result.

Figure 3:
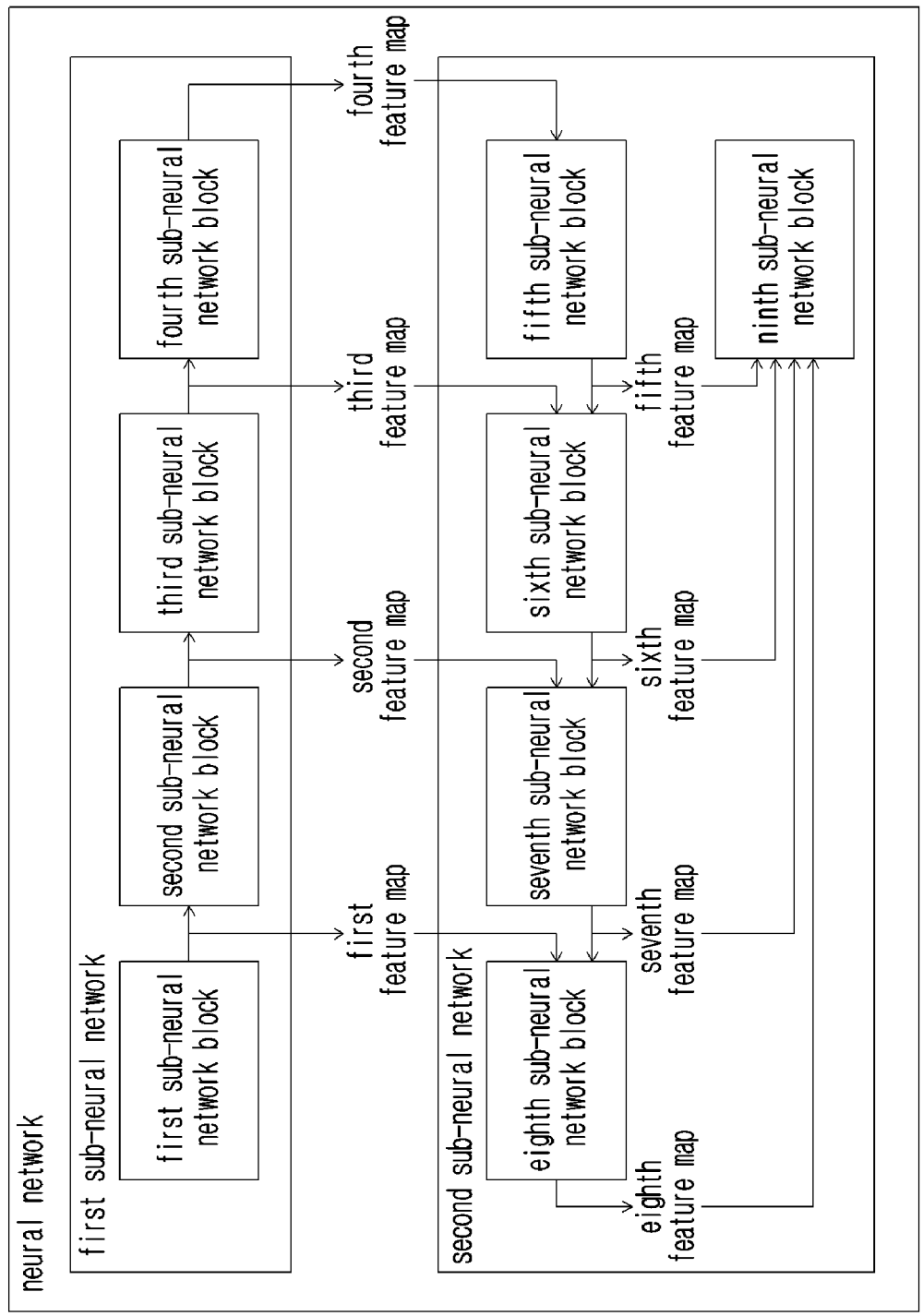
FIG. 3 is a diagram illustrating a neural network structure including a sub-neural network as an embodiment to which the present invention is applied.

FIG. 3 is a diagram illustrating a neural network structure including a sub-neural network as an embodiment to which the present invention is applied.

Referring to FIG. 3, the first sub-neural network may include first to fourth neural network blocks. The first sub-neural network may receive a picture as input and generate first to fourth feature maps. The generated feature maps may be input to the second sub-neural network.

The first neural network block may receive a picture as input and generate a first feature map. The generated first feature map may be input to the second neural network block and may simultaneously be the output of the first sub-neural network. The second neural network block may receive the first feature map as input and generate a second feature map. The generated feature map may be input to the third neural network and may simultaneously be the output of the first sub-neural network. The third neural network block may receive the second feature map as input and generate the third feature map. The generated third feature map may be input to the fourth neural network block and may simultaneously be the output of the first sub-neural network. The fourth neural network block may receive the third feature map as input and generate the fourth feature map. The generated fourth feature map may be the output of the first sub-neural network.

In one embodiment, the first to fourth feature maps may have different sizes. Alternatively, the first to fourth feature maps may have different resolutions. In general, in the case of the fourth feature map that has gone through more neural network blocks, the spatial resolution may be the smallest and the number of channels may be the largest among the four feature maps.

The reason for extracting multiple features, such as the first to fourth feature maps, from a neural network may be to output the same inference result without being affected by changes in the spatial resolution of the input image by performing inference using features of various spatial resolutions.

As an example, the second sub-neural network may include fifth to ninth neural network blocks. The second sub-neural network may receive the first to fourth feature maps as input and output an inference result. The fifth neural network block may receive the fourth feature map as input and generate the fifth feature map. The generated feature map may be input to the sixth neural network block and the ninth neural network block. The sixth neural network block may generate the sixth feature map by receiving the third feature map and the fifth feature map transmitted from the first sub-neural network. The generated sixth feature map may be input to the seventh neural network block and the ninth neural network block. The seventh neural network block may generate the seventh feature map by receiving the second feature map and the sixth feature map tranmitted from the first sub-neural network. The generated seventh feature map may be input to the eighth neural network block and the ninth neural network block. The eighth neural network block may generate the eighth feature map by receiving the first feature map and the seventh feature map transmitted from the first sub-neural network. The generated eighth feature map may be input to the ninth neural network block.

Additionally, the ninth neural network block may generate an inference result using the fifth to eighth feature maps transmitted from the fifth to eighth neural network blocks. In this case, the fifth to eighth feature maps input to the ninth neural network block may have different spatial resolutions, which collects features of various resolutions to infer one inference result, thereby making a constant inference according to the change in the spatial resolution of the input image. This may be to generate results.

As an example, the neural network of FIG. 3 may be configured according to a Feature Pyramid Network (FPN) structure.

Figure 4:
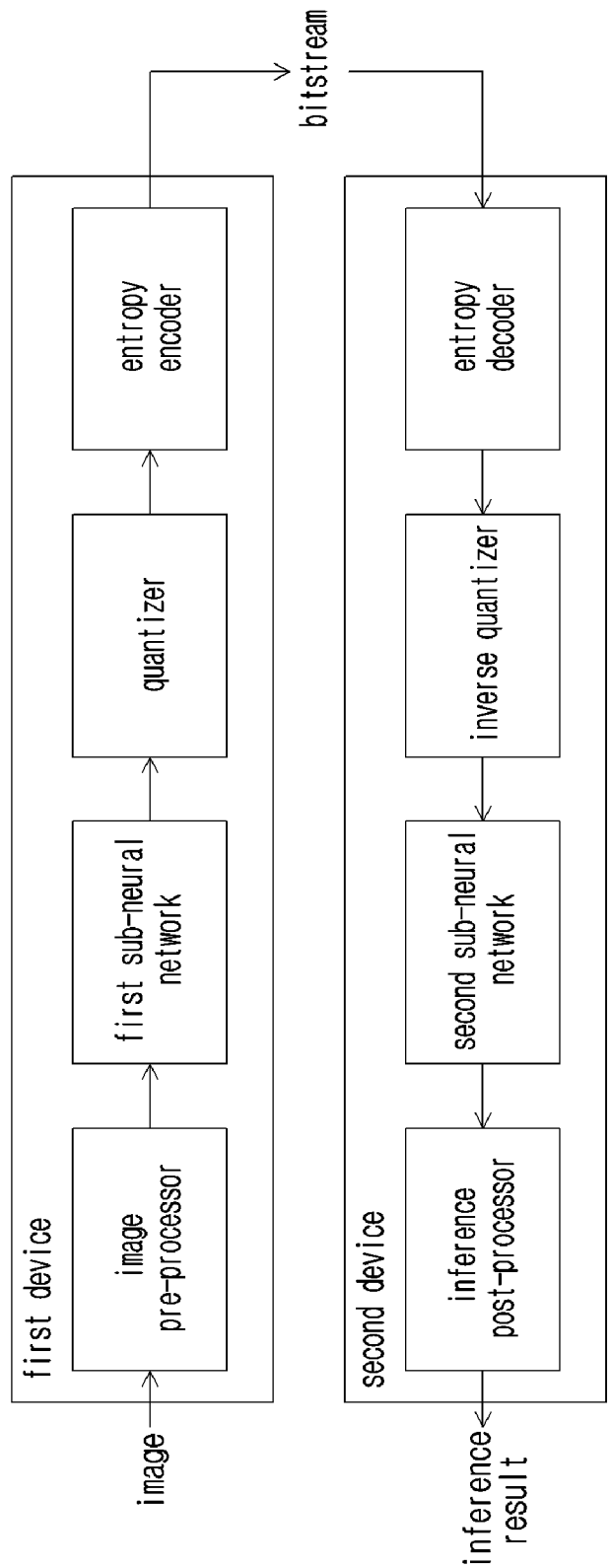
FIG. 4 is a diagram illustrating a block diagram of a neural network-based inferencer using feature map compression according to an embodiment of the present invention.

FIG. 4 is a diagram illustrating a block diagram of a neural network-based inferencer using feature map compression according to an embodiment of the present invention.

The embodiment of FIG. 4 may be a part (w20408) related to evaluation pipeline 2 for evaluating the performance of VCM.

Inferencers that use very deep neural networks have the problem of being difficult to use on low-cost devices due to the high computational amount. Therefore, the image that is the input to the inferencer is sent to the server, input into a very deep neural network for inference, and the generated inference result is sent back to the client device to use the inference result. However, because this method transmits the video to a server, there is a problem that the security of the video containing personal information is reduced. To compensate for this, a method where the feature map, which is an intermediate product of the neural network, is compressed to reduce the amount of personal information and sent to the server, the server receives the intermediate feature map and inputs the intermediate feature map into the remaining sub-neural network to generate inference results, and inference results are sent to the client may be used.

Considering this, as previously explained in FIG. 3, the neural network of the inferencer may be divided into two parts and used as multiple sub-neural networks in different devices. The divided sub-neural networks may use different numbers of layers depending on the hardware specifications and applications of the device.

Referring to FIG. 4, the first device may include an image pre-processor, the first sub-neural network, the quantizer, and the entropy encoder.

The image pre-processor may receive an image, perform pre-processing, and then transmit the image to the first sub-neural network. Here, pre-processing may include all pre-processing processes to create data input to the neural network or to comply with the input data format, such as color space conversion, filtering, and uniformization.

The first sub-neural network may generate a feature map from the input pre-processed image through a plurality of neural network layers. The generated feature map may be transmitted to the quantizer.

The quantizer may quantize the input feature map and generate a quantized feature map. The quantized feature map may be transmitted to the entropy encoder.

The entropy encoder may generate a bitstream by entropy encoding the received quantized feature map. In this case, the entropy encoder may perform a binarization step and a binary arithmetic coding step.

The second device may include the inference post-processor, the second sub-neural network, the inverse quantizer, and the entropy decoder.

The entropy decoder may generate a quantized feature map by entropy decoding the bitstream received from the client. The quantized feature map may be transmitted to the inverse quantizer.

The inverse quantizer may generate a restored feature map by performing inverse quantization on the received quantized feature map. The restored feature map may be transmitted to the second sub-neural network.

The second sub-neural network may generate inference results through a plurality of layers included in the second sub-neural network using the received restored feature map as input.

Figure 5:
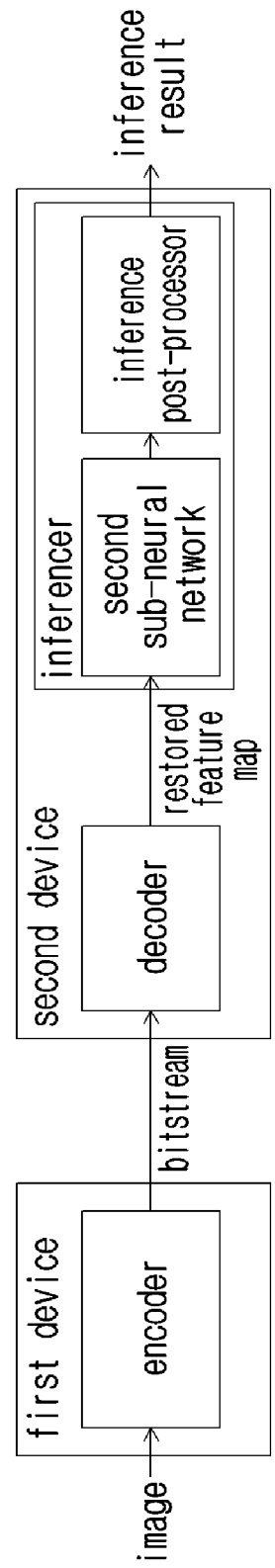
FIG. 5 is a diagram illustrating a block diagram of a neural network-based inferencer using a restored feature map according to an embodiment of the present invention.

FIG. 5 is a diagram illustrating a block diagram of a neural network-based inferencer using a restored feature map according to an embodiment of the present invention.

Referring to FIG. 5, a inferencer according to an embodiment of the present invention may include a first device and a second device. The first device may include an encoder and may receive an image as input and output a bitstream. In this case, the encoder may be a neural network-based encoder. The second device may receive a bitstream and output an inference result. The second device may include a decoder and a inferencer. In FIG. 5, the decoder and the inferencer are shown as separate configurations, but they may be implemented as one configuration. For example, the decoder may be implemented with a configuration that includes a inferencer according to this embodiment.

The decoder may receive a bitstream as input and generate a restored feature map. The generated restored feature map may be input to the inferencer. In this case, the decoder may be a neural network-based decoder. The inferencer may receive the restored feature map as input and output an inference result. The inferencer may include a second sub-neural network and an inference post-processor.

The second sub-neural network may generate an output tensor using the restored feature map received as input through a plurality of neural network layers included in the second sub-neural network. The generated output tensor may be input to the inference post-processor. The inference post-processor may generate the inference result by post-processing the input output tensor according to the application.

Figure 6:
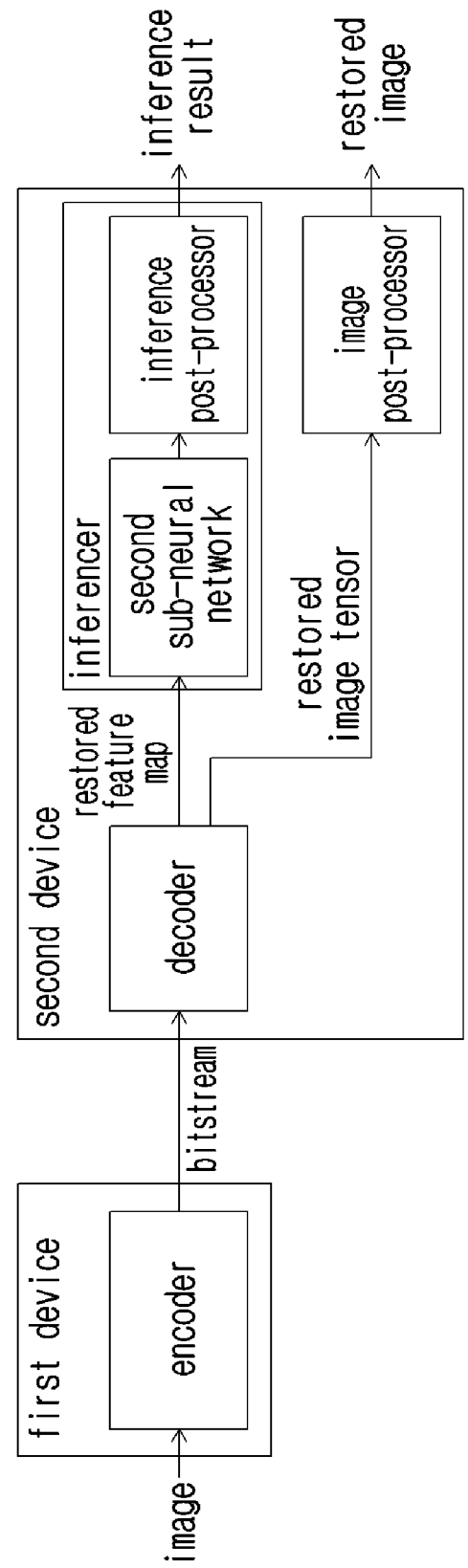
FIG. 6 is a diagram illustrating a block diagram of a neural network-based inferencer that simultaneously performs inference and image encoding/decoding according to an embodiment of the present invention.

FIG. 6 is a diagram illustrating a block diagram of a neural network-based inferencer that simultaneously performs inference and image encoding/decoding according to an embodiment of the present invention.

Referring to FIG. 6, an inferencer according to an embodiment of the present invention may include a first device and a second device. The first device may include an encoder and may receive an image as input and output a bitstream. In this case, the encoder may include one or more of a sub-neural network and an entropy encoder.

The sub-neural network may be a sub-neural network of a neural network trained for image compression and restoration. The sub-neural network may receive an image as input, generate an image bitstream for image restoration, and output it.

Alternatively, the sub-neural network may receive an image as input, generate a feature map for image restoration, and transmit it to the entropy encoder. The sub-neural network may be a sub-neural network of a neural network trained for feature map compression and restoration. The image encoder may entropy-encode the received feature map to generate a bitstream and output it.

The second device may receive a bitstream from the first device and output an inference result and a restored image. The second device may include a decoder, an inferencer, and an image post-processor. The decoder may receive a bitstream, generate a restored feature map, and transmit it to the inferencer. At the same time, it may generate a restored image tensor and transmit it to the image post-processor.

The decoder may include one or more of an entropy decoder and a sub-neural network.

For example, the decoder may include an entropy decoder and a sub-neural network. The entropy decoder may receive a bitstream and perform entropy-decoding to generate a feature map tensor. The generated feature map tensor may be transmitted to the sub-neural network. The sub-neural network may use the feature map tensor to restore the feature map required by the second sub-neural network and simultaneously generate the restored image tensor. In this case, the feature map needed for the second sub-neural network may be a feature map with one or more different spatial resolutions.

The inferencer may receive the restored feature map and output the inference result. The inferencer may include one or more of a second sub-neural network and an inference post-processor. The second sub-neural network may generate an output tensor using the received feature map through a plurality of neural network layers included in the second sub-neural network. The generated output tensor may be transmitted to the inference post-processor. The inference post-processor may generate inference results by post-processing the received output tensor according to the application. The image post-processor may output the restored image by post-processing the received restored image tensor to fit the image output format.

Figure 7:
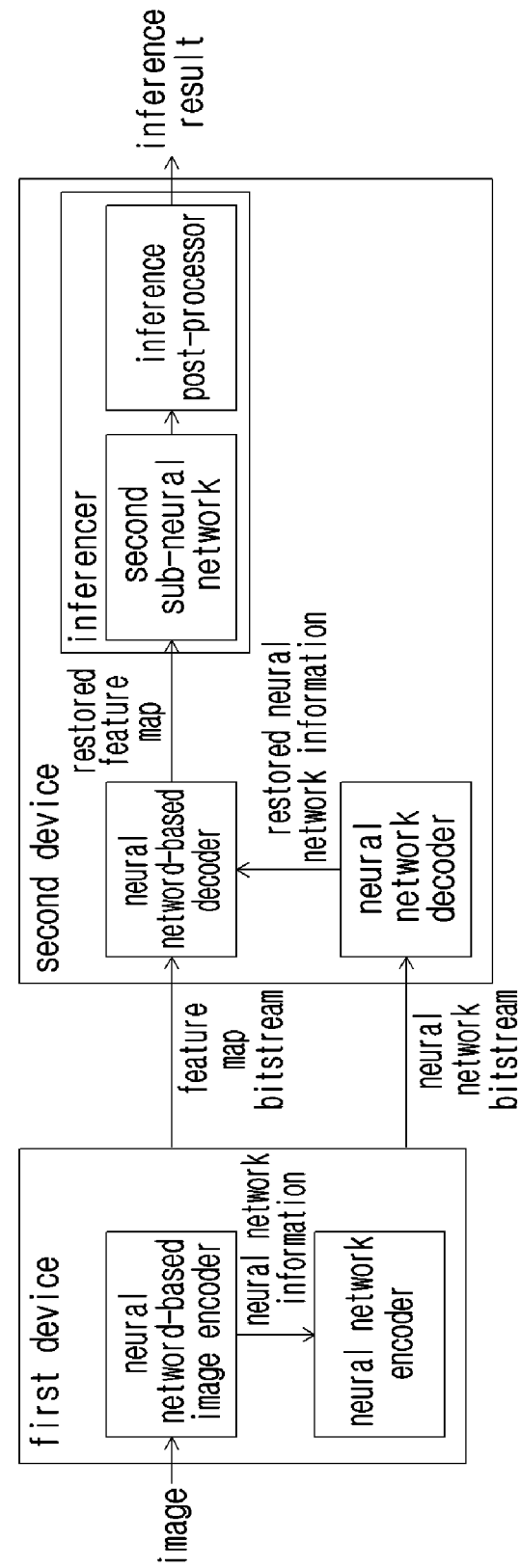
FIG. 7 is a diagram illustrating a block diagram of a inferencer using a neural network encoder/decoder according to an embodiment of the present invention.

FIG. 7 is a diagram illustrating a block diagram of a inferencer using a neural network encoder/decoder according to an embodiment of the present invention.

Referring to FIG. 7, a neural network-based inferencer using neural network encoding/decoding according to an embodiment of the present invention may include a first device and a second device. The first device may receive an image, generate a feature map bitstream and a neural network bitstream, and transmit them to the second device. The first device may include a neural network-based image encoder and a neural network encoder. The neural network-based image encoder and neural network encoder may be implemented as separate and independent configurations, as shown in FIG. 7, or may be implemented as a single configuration. For example, the encoder may include a neural network-based image encoder and a neural network encoder.

A neural network-based encoder may receive an image as input and generate a feature map bitstream. Additionally, neural network information from a neural network-based encoder may be transmitted to the neural network encoder. Here, neural network information may include the number of neural network layers included in the neural network, layer connectivity, layer type, layer parameters, layer weight, etc.

A neural network encoder may generate a neural network bitstream by encoding neural network information received from a neural network-based image encoder. In this case, the neural network weight included in the neural network information may generate a bitstream through CABAC (Context Adaptive Binary Arithmetic coding).

The second device may generate an inference result by restoring the feature map bitstream and the neural network bitstream received from the first device. The second device may include a neural network-based decoder, a neural network decoder, and an inferencer. A neural network-based decoder may generate a restored feature map by receiving the feature map bitstream and the restored neural network information. The generated restored feature map may be input to the inferencer. The neural network decoder may generate restored neural network information by receiving a neural network bitstream and decode the same. The restored neural network information may be transmitted to a neural network-based decoder.

The inferencer may receive the restored feature map as input and generate an inference result. The inferencer may include a second sub-neural network and an inference post-processor. The second sub-neural network may receive the restored feature map as input and generate an output tensor through a plurality of neural network layers included in the second sub-neural network. The generated output tensor may be transmitted to the inference post-processor. The inference post-processor may output the inference result by post-processing the input output tensor.

Figure 8:
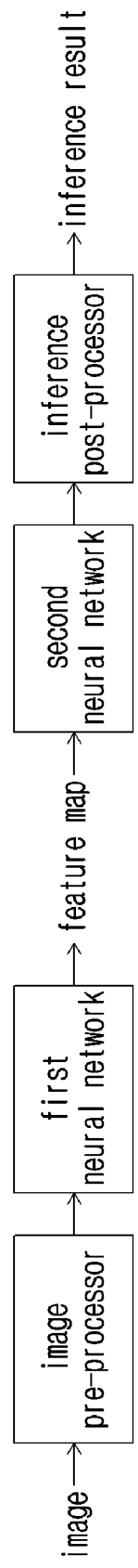
FIG. 8 is a diagram illustrating a block diagram of an inferencer according to an embodiment of the present invention.

FIG. 8 is a diagram illustrating a block diagram of an inferencer according to an embodiment of the present invention.

Referring to FIG. 8, the inferencer may receive an image as input and output an inference result. In this case, the image may be data such as an image, video, point cloud, or mesh. Additionally, the inference result may be data such as an image, video, point cloud, or mesh. Alternatively, the inference result may be an image or video classification result. Alternatively, the inference result may be position information or size information of objects within an image or video.

The inferencer may include an image pre-processor, a first neural network, a second neural network, and an inference post-processor. The above-described inferencer configuration may be implemented as an independent and separate configuration, or may be implemented as a single configuration. Additionally, some configurations of the inferencer may be omitted.

The image pre-processor may receive an image as input and pre-process it to fit the input form to the neural network to generate an input tensor. In this case, pre-processing may include normalization, spatial resolution scaling, etc. The generated input tensor may be transmitted to the first neural network.

In one embodiment of the present invention, the input (or input image) on which the above-described pre-processing is performed may be mesh data. Additionally, the output of the image pre-processor (or the generated input tensor) may be mesh data.

The first neural network may generate a feature map using the input tensor through multiple neural network layers. In this case, the neural network layer may include at least one of a convolution layer, a deconvolution layer, a transposed convolution layer, a dilated convolution layer, and a grouped convolution layer, a graph convolution layer, an average pooling layer, a max pooling layer, an upsampling layer, a downsampling layer, a pixel shuffle layer, a channel shuffle layer, a batch normalization layer, or a weight normalization layer. Here, the feature map may refer to a tensor having one or more dimensions. The generated feature map may be transmitted to the second neural network.

The second neural network may generate an output tensor using the input feature map through one or multiple neural network layers. The generated output tensor may be transmitted to the inference post-processor.

The inference post-processor may output the inference result by post-processing the received output tensor in the output form required by the device that uses the inference result. The inference result may be a classified result of the input image. In such a case, the output tensor may be in the form of one-dimensional data, and the index with the largest value of the output tensor may represent information of the classified class. Therefore, the inference post-processor may find the index with the largest value and output information mapped to the index. Alternatively, the inference result may be in the form of a specific image. In the case of images, since they are expressed as limited integer data values, scaling and clipping may be performed in the inference post-processor.

FIG. 9 is a diagram illustrating a neural network and feature map according to an embodiment of the present invention.

Referring to FIG. 9, a neural network for inference may include a first neural network and a second neural network. As an example, the neural network for inference may be divided into a first neural network and a second neural network based on a specific position (reference point) within the overall neural network layer structure. The first neural network may generate a feature map through neural network layers within the first neural network, and transmit the generated feature map to the second neural network. The second neural network may perform inference on the input feature map through neural network layers.

Figure 9A:
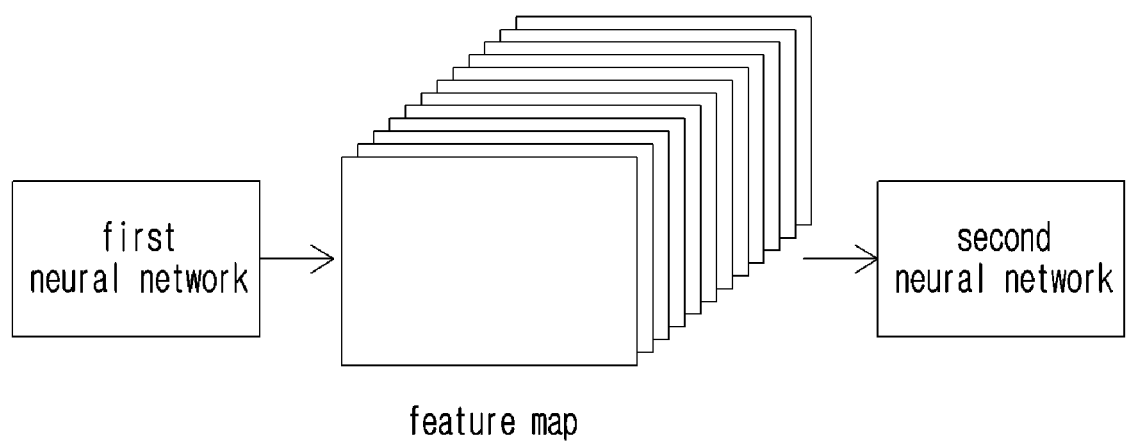
FIG. 9 is a diagram illustrating a neural network and feature map according to an embodiment of the present invention.

In one embodiment, in this case, the feature map may be a single tensor, which is three-dimensional data, as shown in FIG. 9A. In other words, the form of the feature map may be pre-defined as shown in FIG. 9A. As an example, a feature map may represent a feature map channel group including a plurality of channels. At least one of the size, resolution, and scale of the feature map may be fixed within a feature map channel group. Alternatively, the number of channels within the feature map channel group may be fixed.

Figure 9B:
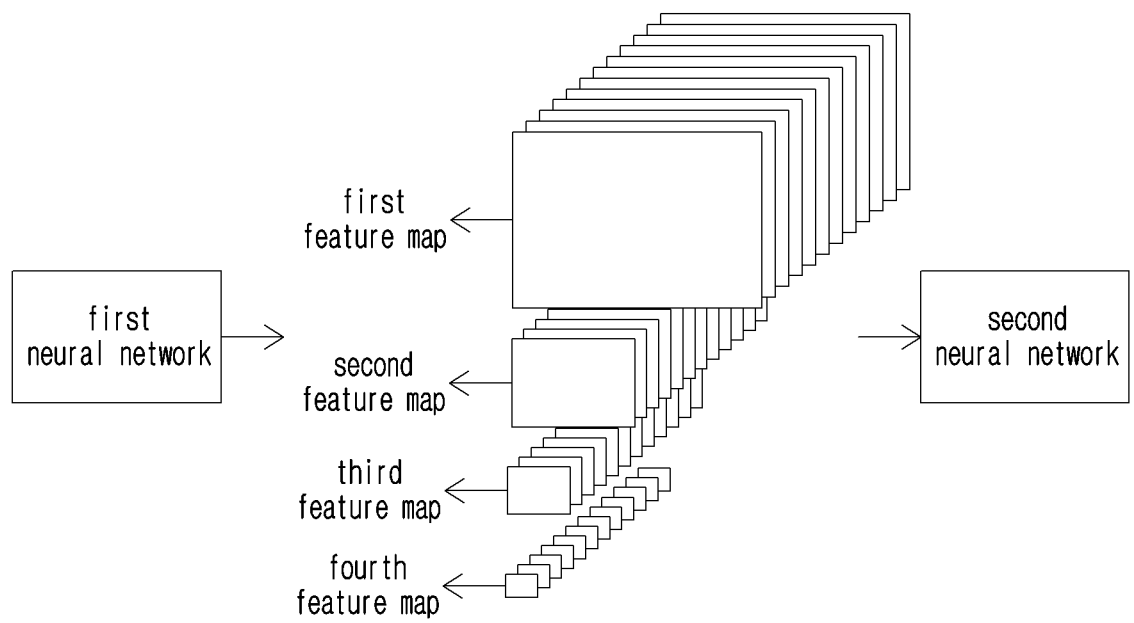

Alternatively, the feature map may be multiple tensors as shown in FIG. 9B. For example, the first to fourth feature maps may be output from the first neural network, and each feature map may be generated in a different neural network layer.

Figure 9C:
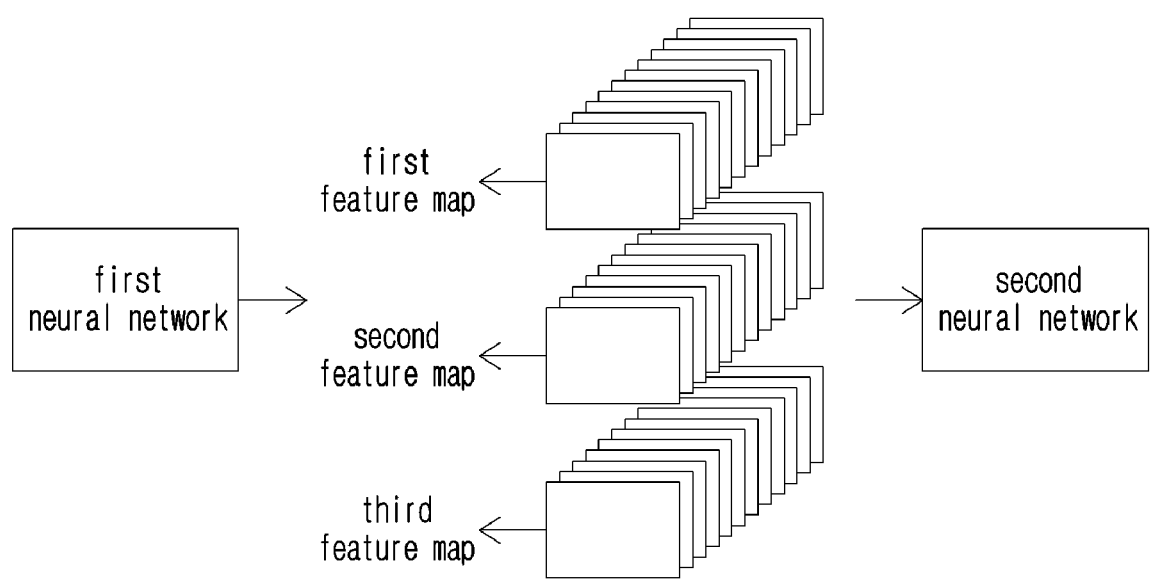

Alternatively, the feature map may be a tensor with the same spatial resolution and the same number of channels as shown in FIG. 9C. In this case, the first to third feature maps may be generated in the same neural network layer and may be input to different neural network layers of the second neural network.

In another embodiment, the above-described feature map may be multiple tensors with different spatial resolutions. Alternatively, the feature map may be multiple tensors with the different number of channels.

Figure 10:
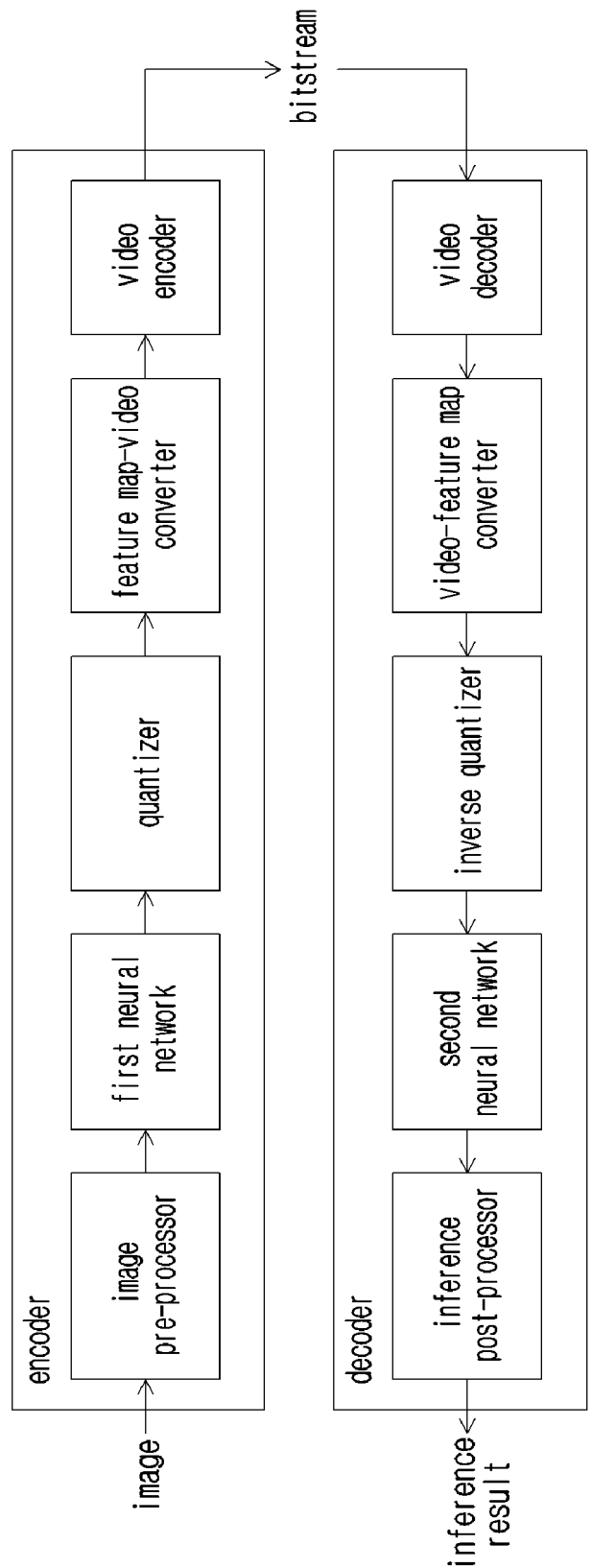
FIG. 10 is a block diagram showing the compression and inference process according to one embodiment of the present invention.

FIG. 10 is a block diagram showing the compression and inference process according to one embodiment of the present invention.

Referring to FIG. 10, an inferencer using video compression may include an encoder and a decoder. The encoder may receive an image as input and generate a bitstream. The generated bitstream may be transmitted to the decoder. The encoder may include an image pre-processor, a first neural network, a quantizer, a feature map-video converter (may be referred to as a converter), and a video encoder. The above-described encoder configuration may be implemented as an independent and separate configuration, or may be implemented as a single configuration. Additionally, some configurations of the encoder may be omitted.

The image pre-processor may pre-process the input image and convert it into an input tensor. In this case, pre-processing may include all processes of converting to fit the input of the first neural network, such as normalization, scaling, and movement between devices. The generated input tensor may be input to the first neural network.

In one embodiment of the present invention, the input (or input image) on which the above-described pre-processing is performed may be mesh data. Additionally, the output of the image pre-processor (or the generated input tensor) may be mesh data.

The first neural network may generate one or multiple feature maps using the input tensor through multiple neural network layers. The generated feature map may be transmitted to the quantizer.

In one embodiment of the present invention, the first neural network or the second neural network may include a graph convolution layer. The convolution layer may extract features of the image and generate (or update) a feature map based on the extracted features. The graph convolution layer represents a convolution layer that extracts features based on graph data. Graph data may include a plurality of node information (vertex information) and/or connection information between a plurality of nodes (edge information). As an example, a wavelet transform may be used in the graph convolution layer. As an example, a graph-based wavelet transform may be used in a graph convolution layer. Graph-based wavelet transform may be referred to as lifting transform. As an example, the first neural network may use wavelet transform and lifting transform, and the second neural network may use inverse wavelet transform and inverse lifting transform.

The quantizer may quantize the input feature map and generate a quantized feature map. The quantized feature map may be transmitted to the feature map-video converter.

The feature map-video converter may convert the input quantized feature map into a video (or image) and then generate an input video (or input image) of the video encoder. Alternatively, the input video format of the video encoder may be pre-defined. The feature map-video converter may convert the quantized feature map into a video having a pre-defined format.

For example, a video may have a specific number of channels, and resolution, color components, and subsampling format for each channel may be defined. For example, the video may have three channels, and the spatial resolution of each channel may be the same. Alternatively, multiple channels within a video may have different spatial resolutions. The spatial resolution information of the channel may be pre-defined or transmitted as video input format information of the video encoder. Alternatively, it may be transmitted as chroma subsampling information of the video. In other words, the feature map-video converter may convert a feature map with multiple channels into a video according to 4:4:4, 4:2:2, and 4:2:0 chroma subsampling formats through spatial resolution scaling, padding, etc. The generated video may be transmitted to a video encoder. By an agreement between the encoder and the decoder, the conversion method may be performed in the reverse process of each other. Alternatively, various conversion methods may be used by transmitting related information.

A video encoder may generate a bitstream by encoding the input video. The generated bitstream may be transmitted to the decoder. In this case, an existing video encoder may be used as the video encoder. For example, video encoders such as H.264/AVC, H.265/HEVC, H.266/VVC, VP8, VP9, AV1, etc. may be used.

The decoder may receive a bitstream as input and output an inference result. The decoder may include an inference post-processor, a second neural network, an inverse-quantizer, a video-feature map converter, and a video decoder. The above-described decoder configuration may be implemented as an independent and separate configuration, or may be implemented as a single configuration. Additionally, some configurations of the decoder may be omitted.

The video decoder may generate restored video by decoding the input bitstream. In this case, the video decoder may use a decoder with the same compression technology as the video encoder used in the encoder. The restored video may be transmitted to the video-feature map converter.

The video-feature map converter may receive the restored video and generate a restored quantized feature map after conversion. In this case, the video-feature map converter may perform the reverse process of the process performed by the feature map-video converter. Therefore, related information may be received from the encoder. Alternatively, the same conversion process may be performed. The generated restored quantization features may be transmitted to the inverse-quantizer.

The inverse-quantizer may generate a restored feature map by inverse-quantizing the received restored quantized feature map. The restored feature map may be transmitted to the second neural network.

The second neural network may generate an output tensor using the restored feature map received as input through a plurality of neural network layers included in the second neural network. The generated output tensor may be transmitted to the inference post-processor.

The inference post-processor may output the inference result by post-processing the input output tensor.

Figure 11:
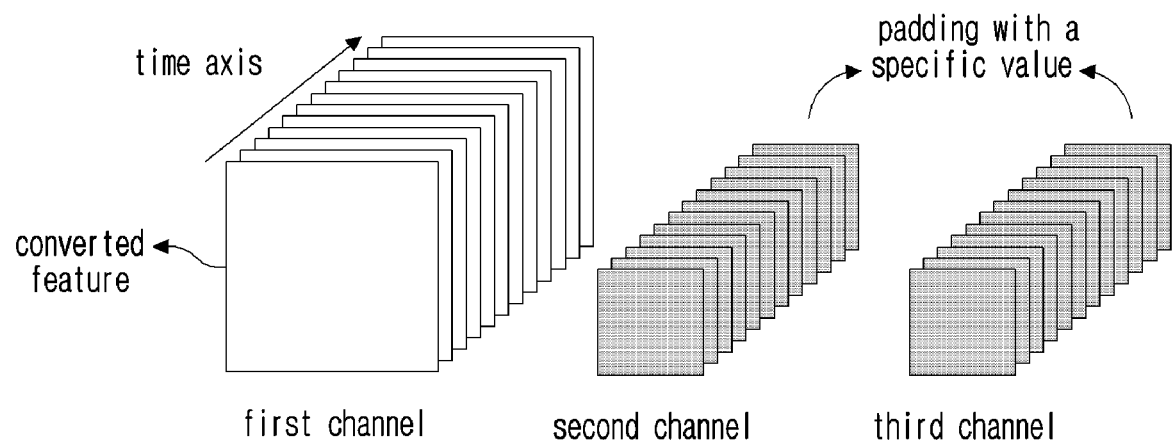
FIG. 11 is a diagram for explaining feature map conversion according to an embodiment of the present invention.

FIG. 11 is a diagram for explaining feature map conversion according to an embodiment of the present invention.

FIG. 11 may be an example of a video generated by the feature map-video converter previously described in FIG. 10.

According to an embodiment of the present invention, the feature map may have multiple features (feature maps) on the channel axis. In this case, the feature map-video converter may change (or convert) a plurality of features on the channel axis into video by arranging them on the time axis. As described above, the feature map-video converter may convert the feature map by considering the input format of the video in the video encoder.

In this case, the input format of the video in the video encoder may be a 3-channel, 4:2:0 subsampled video. To support this case, all frames (features) of the second and third channels may be padded with a specific value. In this case, the specific value may be an intermediate value according to the bit depth supported by the video encoder. Alternatively, it may be a specific value entered by the user. Alternatively, the input format of the video in the video encoder may be a 4:0:0 video format that uses only one channel.

Additionally, the spatial resolution of the feature map may be converted to improve the coding efficiency of the video encoder. For example, the feature map-video converter may adjust the horizontal or vertical length by sampling the feature map to fit the size of a multiple of the coding unit of the video compression technology.

Figure 12:
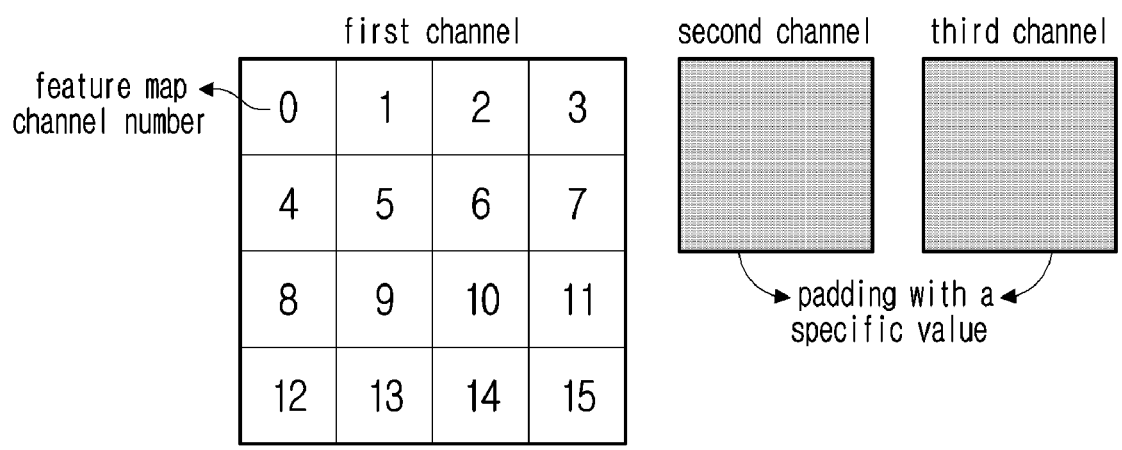
FIG. 12 is a diagram for explaining a feature map mapping method according to an embodiment of the present invention.

FIG. 12 is a diagram for explaining a feature map mapping method according to an embodiment of the present invention.

FIG. 12 may be an example of a video mapping method performed by the feature map-video converter previously described in FIG. 10. Referring to FIG. 12, a feature map may be mapped to one channel of a video. A feature map may have multiple features on the channel axis.

In one embodiment, the feature map-video converter may generate a video by sequentially mapping multiple features of the channel axis in space. In this case, the mapping method in space may be done in the same order as the channel numbers of the feature map. Alternatively, when mapping is done by changing the order, information on the changed order may be transmitted to the decoder. Additionally, horizontal and vertical size information of the mapped feature map may be transmitted to the decoder.

In one embodiment, the input format of the video in the video encoder may be 3-channel having different spatial resolutions. To support this case, all frames in the second and third channels may be padded with a specific value. In this case, the specific value may be an intermediate value according to the bit depth supported by the video encoder. Alternatively, it may be a specific value entered by the user.

Additionally, according to an embodiment of the present invention, the feature map-video converter may pack the feature map in the form of an image. The feature map-video converter may perform image packing of the feature map in a predefined specific order. In this case, the predefined specific order may be a raster scan order or a z-scan order.

As described above, the neural network according to an embodiment of the present invention may use wavelet transform (or lifting transform). When wavelet transform is used, transform coefficients to which wavelet transform is applied may be output from the neural network. Transform coefficients may be output for each frequency component.

As an example, the output transform coefficients may correspond to a feature map according to an embodiment of the present invention. Transform coefficients may be packed in units of blocks (or coefficient groups), and packing may be performed in a predefined specific order. In this case, the block unit may be determined for each frequency component. Alternatively, the block unit may be a transform coefficient group, and the transform coefficient group may sequentially include the specific number of transform coefficients. Additionally, the predefined specific order may be a raster scan order or a z-scan order. This embodiment is not limited to the embodiment of FIG. 12, and may be applied in the same or similar manner to the feature map mapping embodiments described later.

Figure 13:
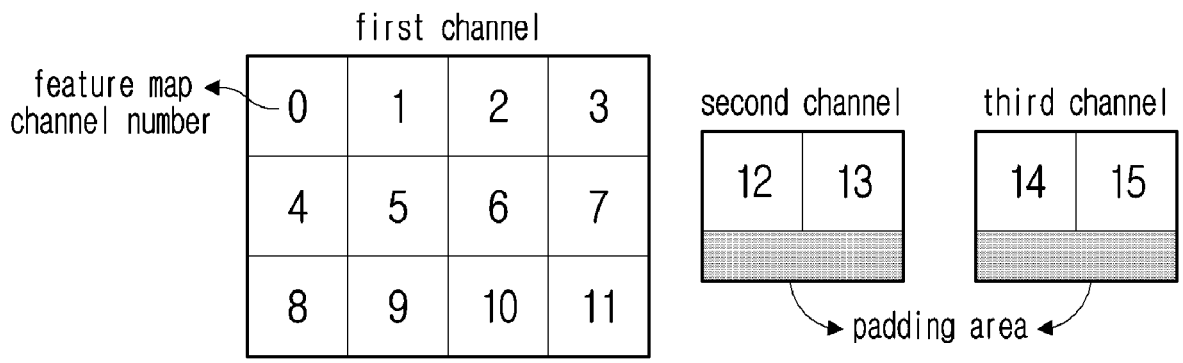
FIG. 13 is a diagram for explaining a feature map mapping method according to an embodiment of the present invention.

FIG. 13 is a diagram for explaining a feature map mapping method according to an embodiment of the present invention.

FIG. 13 may be an example of a video generated by the feature map-video converter previously described in FIG. 10. The feature map may have multiple features on the channel axis and may be mapped to multiple channels of the video.

In one embodiment, the feature map-video converter may generate an image by mapping multiple features of the channel axis in order in space. In this case, as a method of mapping in space, there may be a method of mapping in the same order as the channel numbers of the feature map. Alternatively, the feature map-video converter may change the channel number order of the feature map for mapping. When mapping is done by changing the order, information on the order may be transmitted to the decoder. Alternatively, horizontal and vertical size information of the mapped feature map may be transmitted to the decoder.

In one embodiment, the input format of the video in the video encoder may be 3-channel having different spatial resolutions. In this case, the features of the feature map may be mapped by dividing them into the first to third channels of video. For example, the feature map before conversion in FIG. 13 may have 16 feature maps. In this case, in order of channel numbers, the first 12 features may be mapped to the first channel, the next two channels may be mapped to the second channel, and the next two channels may be mapped to the third channel.

In this case, the feature map mapped to the first to third channels may be mapped without resolution conversion. In this case, an area remaining on either side may occur between the first channel and the second and third channels depending on the video resolution ratio. This area is called a padding area, and this area may be padded with an intermediate value of the bit depth supported by the video encoder.

Figure 14:
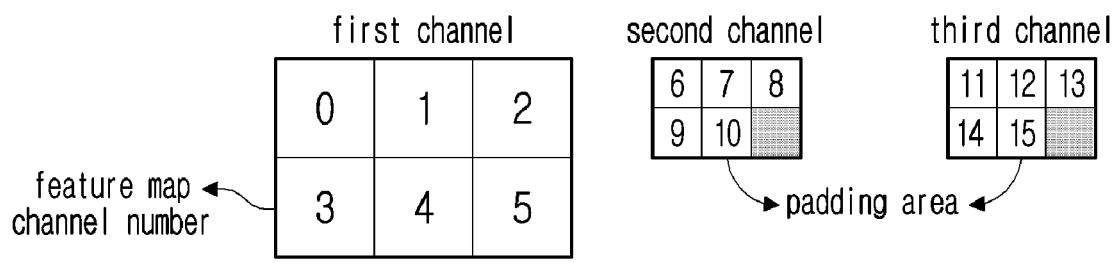
FIG. 14 is a diagram explaining a feature map mapping method according to an embodiment of the present invention.

FIG. 14 is a diagram explaining a feature map mapping method according to an embodiment of the present invention.

FIG. 14 may be an example of a video generated by the feature map-video converter previously described in FIG. 10. The feature map may have multiple features on the channel axis, and may be mapped to multiple channels of the video with the changed spatial resolution.

In this case, the feature map-video converter may generate an image by sequentially mapping multiple features of the channel axis in space. As an example, as a method of mapping in space, there may be a method of mapping in space in the same order as the channel numbers of the feature map. Alternatively, the feature map-video converter may change the channel number order of the feature map for mapping. When mapping is done by changing the order, information on the order may be transmitted to the decoder. Additionally, horizontal and vertical size information of the mapped feature map may be transmitted to the decoder.

In one embodiment, the input format of the video in the video encoder may be 3-channel having different spatial resolutions. In this case, the features of the feature map may be mapped by dividing them into the first to third channels of video. The feature map before conversion in FIG. 14 may have 16 feature maps. In this case, the specific number of features may be mapped to each channel depending on the number of channels. As an example, since 16 feature maps need to be mapped by dividing them into 3 channels, they may be mapped by dividing them into 6, 5, and 5 channels.

Additionally, spatial resolution scaling (or resolution conversion) may be performed on feature maps mapped to the second and third channels of the video depending on the input format of the video encoder. The area remaining after being mapped to each channel is a padding area and may be mapped to a specific value. In this case, a specific value determined by the user may be entered. Alternatively, it may be padded with the intermediate value of the video encoder.

Figure 15:
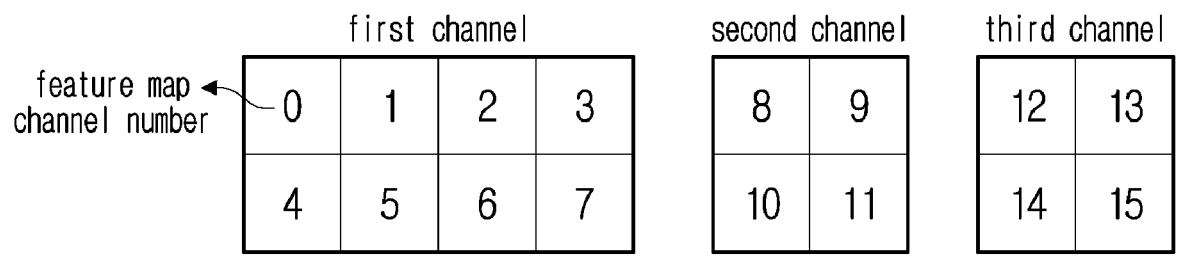
FIG. 15 is a diagram for explaining a feature map mapping method according to an embodiment of the present invention.

FIG. 15 is a diagram for explaining a feature map mapping method according to an embodiment of the present invention.

According to one embodiment of the present invention, the feature map may be mapped to multiple channels of video by considering the chroma sub-sampling format. FIG. 15 may be an example of a video generated by the feature map-video converter previously described in FIG. 10. The quantized feature map input to the feature map-video converter may have multiple feature maps and may be mapped to multiple channels of the video to fit chroma subsampling.

In one embodiment, the feature map-video converter may perform mapping according to a specific chroma subsampling method of the video. For example, in the case of 4:2:2 chroma subsampling video, the number of features in the feature map (or the number of 2D feature maps) may be assigned to each channel as 8, 4, or 4 according to the subsampling format of 4:2:2. Additionally, the resolution of the second and third channels may be determined based on the resolution of the first channel and chroma subsampling, and a feature map may be mapped according to the determined resolution. Additionally, if changing the spatial resolution of the features is necessary, it may be additionally performed and mapped.

FIG. 16 is a diagram for explaining a feature map mapping method according to an embodiment of the present invention.

According to one embodiment of the present invention, the feature map may be mapped by changing the spatial resolution to multiple channels of the video by considering the chroma subsampling format. FIG. 16 may be an example of a video generated by the feature map-video converter previously described in FIG. 10. The quantized feature map input to the feature map-video converter may have multiple feature maps, and may be mapped to multiple channels of the video by changing the spatial resolution to fit chroma subsampling.

In this case, the feature map-video converter may perform mapping according to a specific chroma subsampling method of the video. For example, in the case of 4:2:0 chroma subsampling video, the spatial resolution of the second and third channels may be determined based on the spatial resolution of the first channel and the chroma sub-sampling, and it may be mapped by changing the spatial resolution of the feature according to it. In this case, the spatial resolution may be changed by maintaining the width or height and scaling the other side. In other words, asymmetric scaling (resolution conversion) may be performed to allocate feature maps for the second and third channels. The second and third channels in FIG. 16 may be an example of performing mapping by asymmetrically converting the resolution by maintaining the horizontal length of the feature and reducing the vertical length by half.

FIG. 17 is a diagram for explaining a feature map mapping method according to an embodiment of the present invention.

FIG. 17 may be an example of a video generated by the feature map-video converter previously described in FIG. 10. The quantized feature map input to the feature map-video converter may have multiple features.

When the data input to the neural network is a video, feature maps may be generated continuously over time, and in this case, it can be effective to generate one feature map into one frame. According to one embodiment of the present invention, the feature map-video converter may classify the input features and map them to place close to each other in the video. In other words, when generating one frame, features that are likely to have high inter-frame prediction efficiency may be classified into several classes (or categories) and mapped by placing the classified features in adjacent areas.

In this case, the correlation between features may be used for high degree of prediction efficiency. Alternatively, features (or feature maps) may be classified into the predefined number of classes according to the properties of the features. Alternatively, features (or feature maps) may be classified into the predefined number of classes based on the spatial similarity of the input image. Alternatively, features (or feature maps) may be classified based on a neural network. If classified features are mapped close to each other, a video encoder may perform video compression using coding units such as tiles/slices.

Figure 18:
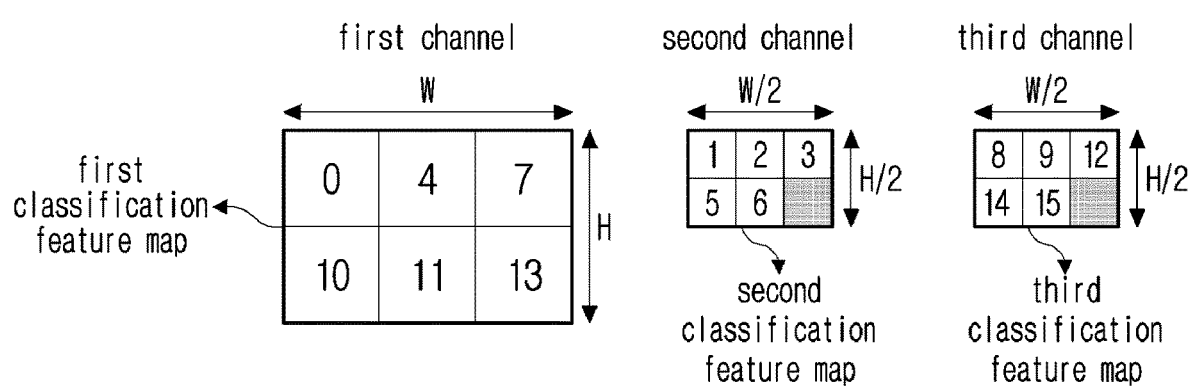
FIG. 18 is a diagram for explaining a feature map mapping method according to an embodiment of the present invention.

FIG. 18 is a diagram for explaining a feature map mapping method according to an embodiment of the present invention.

FIG. 18 is an example of a video generated by the feature map-video converter previously described in FIG. 10 and may be an example of a method of evaluating (or classifying) the importance of features and mapping them to different channels according to the importance.

In the case of video compression technology, the chroma signal input to the second and third channels may generally be less important than the luma signal mapped to the first channel. Considering this, the feature map-video converter may perform compression using a high quantization parameter for the chroma signals of the second and third channels. To use these features, the importance of the features may be evaluated and mapped to different channels.

In this case, the importance of the feature may be evaluated using the total size of the feature values of the corresponding channel as a factor. Alternatively, the importance of a feature may be evaluated using the size of the sum of the squares of the feature values of the corresponding channel as a factor. Alternatively, the importance of features may be evaluated through a separate neural network, and various machine learning methods may be used.

Embodiments described above may be a combination of components and features of the present disclosure in a predetermined form. Each component or feature should be considered selective unless explicitly stated otherwise. Each component or feature may be implemented in a form which is not combined with other component or feature. In addition, some components and/or features may be combined to configure an embodiment of the present disclosure. Order of operations described in embodiments of the present disclosure may be changed. Some configurations or features of an embodiment may be included in other embodiment or may be replaced with a configuration or a feature corresponding to other embodiment. It is obvious that claims without an explicit citation relationship in a scope of claims may be combined to configure an embodiment or may be included as a new claim by amendment after application.

An embodiment according to the present disclosure may be implemented by a variety of means, for example, hardware, firmware, software, or a combination thereof, etc. For implementation by hardware, an embodiment of the present disclosure may be implemented by one or more ASICs (application specific integrated circuits), DSPs (digital signal processors), DSPDs (digital signal processing devices), PLDs (programmable logic devices), FPGAs (field programmable gate arrays), processors, controllers, micro controllers, micro processors, etc.

In addition, for implementation by firmware or software, an embodiment of the present disclosure may be implemented in a form of a module, a procedure, a function, etc. performing functions or operations described above and may be recorded in a readable recoding medium through a variety of computer means. Here, a recording medium may include a program instruction, a data file, a data structure, etc. alone or in combination. A program instruction recorded in a recording medium may be those specially designed and configured for the present disclosure or those available by being notified to a person skilled in computer software. For example, a recording medium includes magnetic media such as a hard disk, a floppy disk and a magnetic tape, optical media such as CD-ROM (Compact Disk Read Only Memory) and DVD (Digital Video Disk), magneto-optical media such as a floptical disk and a hardware device which is specially configured to store and perform a program instruction such as ROM, RAM, a flash memory, etc. An example of a program instruction may include a high-level language code which may be executed by a computer by using an interpreter, etc. as well as a machine language code like what is made by a compiler. Such a hardware device may be configured to operate as at least one software module to perform an operation of the present disclosure and vice versa.

In addition, a device or a terminal according to the present disclosure may be driven by a command which causes at least one processor to perform functions and processes described above. For example, such a command may include, for example, an interpreted command like a script command such as a JavaScript or ECMAScript command, etc. or other commands stored in a computer readable medium readable or an executable code. Further, a device according to the present disclosure may be implemented in a distributed way across a network such as Server Farm or may be implemented in a single computer device.

In addition, a computer program which comes with a device according to the present disclosure and executes a method according to the present disclosure (also known as a program, software, a software application, a script or a code) may be written in any form of a programming language including a compiled or interpreted language or a priori or procedural language and may be deployed in any form including a stand-alone program, module, component or subroutine or other units suitable for use in a computer environment. A computer program does not necessarily correspond to a file of a file system. A program may be stored in a single file provided for a requested program, or in multiple interacting files (e.g., a file storing part of at least one module, subprogram or code), or in part of a file owning other program or data (e.g., at least one script stored in a markup language document). A computer program may be positioned in one site or distributed across a plurality of sites and may be deployed to be executed on one computer or multiple computers interconnected by a communication network.

It is obvious to a person skilled in the art that the present disclosure may be implemented in other specific form without departing from an essential feature of the present disclosure. Accordingly, the above-described detailed description should not be interpreted restrictively in all respects and should be considered illustrative. A scope of the present disclosure should be determined by reasonable interpretation of attached claims and all changes within an equivalent scope of the present disclosure are included in a scope of the present disclosure.

INDUSTRIAL AVAILABILITY

The present invention may be used in neural network-based image processing methods and devices.

The invention claimed is:

1. A neural network-based image processing method, comprising:
   performing pre-processing on an input image;
   obtaining a feature map from the pre-processed image using a neural network including a plurality of neural network layers;
   performing quantization on the obtained feature map; and
   performing video conversion on the quantized feature map,
   wherein performing the video conversion comprises mapping the quantized feature map to a video including luma and chroma channels, and
   wherein the quantized feature map is mapped to the video by sequentially assigning the plurality of feature map channels included in the quantized feature map to the luma and chroma channels of the video according to channel numbers.

2. The method of claim 1, wherein performing the pre-processing comprises generating an input tensor by performing at least one of normalization or resolution scaling on the input image according to a predefined specific condition, and
   wherein the specific condition is defined in consideration of an input format of the neural network.

3. The method of claim 2, wherein the feature map is generated by applying the plurality of neural network layers included in the neural network to the input tensor, and
   wherein the plurality of neural network layers includes at least one of a convolution layer, a graph convolution layer, a pooling layer, a sampling layer, a shuffle layer, or a normalization layer.

4. The method of claim 1, further comprising:
   generating a bitstream by encoding the converted video using a video encoder.

5. The method of claim 1, wherein the obtained feature map includes mesh data.

6. The method of claim 1, wherein the plurality of feature map channels included in the quantized feature map is assigned to the luma and chroma channels according to the channel numbers in a predefined order.

7. The method of claim 1, wherein mapping the quantized feature map to the video comprises performing padding on a remaining region to which the plurality of feature map channels included in the quantized feature map are not assigned based on at least one channel among the luma and chroma channels.

8. The method of claim 1, wherein mapping the quantized feature map to the video comprises performing asymmetric scaling on feature map channels assigned to the chroma channels based on of a color format of the video.

9. The method of claim 1, wherein mapping the quantized feature map to the video comprises:
   classifying the plurality of feature map channels included in the quantized feature map into a predefined number of classes according to an attribute; and
   assigning the plurality of feature map channels included in the quantized feature map to the luma and chroma channels according to the classified classes.

10. The method of claim 9, wherein the plurality of feature map channels are classified based on spatial similarity of the input image.

11. A neural network-based image processing device, comprising:
    a processor configured to control the image processing device; and
    a memory connected to the processor, the memory configured to store data,
    wherein the processor is configured to:
    perform pre-processing on the input image,
    obtain a feature map from the pre-processed image using a neural network including a plurality of neural network layers,
    perform quantization on the obtained feature map, and
    perform video conversion on the quantized feature map,
    wherein performing the video conversion comprises mapping the quantized feature map to a video including a plurality of channels, and
    wherein the quantized feature map is mapped to the video by sequentially assigning the plurality of feature map channels included in the quantized feature map to the luma and chroma channels of the video according to channel numbers.

* * * * *